United States Patent [19]

Borre

[11] 4,179,378

[45] Dec. 18, 1979

[54] FILTER LEAF

[75] Inventor: Earl A. Borre, Itasca, Ill.

[73] Assignees: Industrial Filter & Pump Mfg. Co., Cicero, Ill.; Industrial Filter & Pump Mfg. Co., Cicero, Ill.

[21] Appl. No.: 913,482

[22] Filed: Jun. 7, 1978

[51] Int. Cl.² ............................................. B01D 33/26
[52] U.S. Cl. .................................... 210/232; 210/331; 210/486
[58] Field of Search ............... 210/330, 331, 327, 486, 210/334, 346, 232; 64/21; 285/DIG. 19; 55/502, 351, 507, 509

[56] References Cited

U.S. PATENT DOCUMENTS

| | | | |
|---|---|---|---|
| 3,287,886 | 11/1966 | Tiberi | 55/502 |
| 3,985,656 | 10/1976 | Arvanitakis | 210/327 |
| 4,083,202 | 4/1978 | Westercamp | 64/21 |

Primary Examiner—Frank Sever
Attorney, Agent, or Firm—Edmond T. Patnaude; Edmond T. Patnaude

[57] ABSTRACT

The hubs of adjacent rotary filter leaves are sealed together by means of a unitary, rigid ring which extends across the interface between the leaves and sealably engages annular gaskets mounted in circumferential grooves in the hubs.

6 Claims, 4 Drawing Figures

FILTER LEAF

The present invention relates in general to the art of filtration, and it relates more particularly to a novel filter leaf assembly for use in a pressure filter of the type wherein a plurality of filter leaves are mounted in juxtaposed relationship on a tubular outlet manifold extending through the central hub portions of the leaves.

BACKGROUND OF THE INVENTION

The usual construction of rotary pressure leaf filters employs a perforated outlet manifold on which a plurality of circular filter leaves are stacked with the hub portions being forced together by means of a nut threaded on the distal end of the manifold. In order to prevent spurious leakage into the outlet manifold between the interfaces of the hubs, o-ring sealing gaskets have been positioned in facial grooves in the hubs and held in compression as the hubs are forced together on the outlet manifold. Relatively frequent replacement of the o-rings have been required to prevent the unfiltered liquid from leaking past these rings into the manifold.

For many applications, the faces of the filter leaves are covered with a cloth fabric which is sealed to the hub by means of a ring type clamp which compresses the fabric against an annular rubber gasket disposed on the circumferential surface of the hub. I have found this construction to be unsatisfactory for some applications because the gasket when hot is readily deformed by the pressure differential across it whereby it is forced into the drainage member where it interferes with the flow of filtered liquid through the drainage member into the manifold. Moreover, this flow of the gasket material can result in leakage between the fabric and the gasket.

There are a large number of filter leaves of this type in use and the cost of replacement would be extremely great. Therefor, it would be desirable to provide a way to modify the existing filter leaves to avoid the two major problems discussed above. Moreover, it would be desirable to provide a new and improved filter leaf construction which eliminates these heretofore mentioned problems.

SUMMARY OF THE INVENTION

Briefly, in accordance with one aspect of the present invention, leakage at the interface of adjacent filter leaves is prevented in existing leaves by providing circumferential grooves carrying respective o-ring type gaskets in the leaf hubs and overlying the gaskets in adjacent leaves with a unitary, rigid tubular ring which extends across the interface and sealably and slidably engages the two gaskets.

In accordance with another aspect of the invention the tubular ring is replaced by an annular flange which is integral with the hub of one leaf and which extends over the annular sealing gasket of the next adjacent leaf to provide a seal between the two leaves.

In order to prevent deformation of the rubber gaskets in existing leaves, in accord with the present invention annular grooves are provided in the circumferential surfaces of the hubs which grooves are spaced from, but are in proximity to the drainage members, and the rubber sealing gaskets are positioned in these grooves and clamped therein by the annular clamps which also hold the fabric in place against the gaskets. In a modification of this aspect of the invention the rubber gaskets are eliminated and the fabric material is clamped directly into the grooves.

GENERAL DESCRIPTION OF THE DRAWING

The present invention will be better understood by a reading of the following detailed description taken in connection with the accompanying drawing wherein.

DETAILED DESCRIPTION OF THE INVENTION

Figure 1:
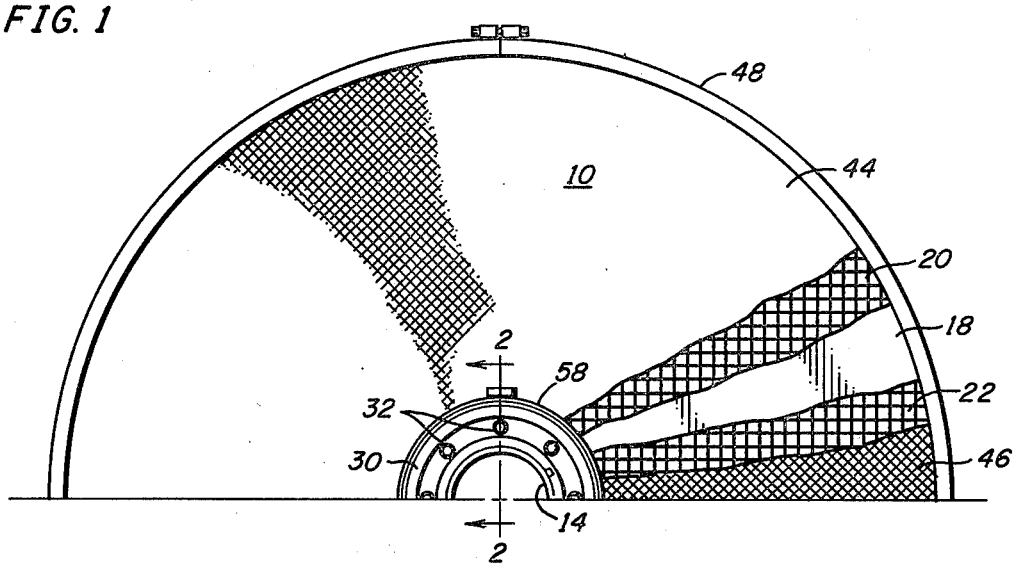
FIG. 1 is an elevational view, partly broken away, of one-half of a circular filter leaf mounted on an outlet manifold and embodying the present invention.
Figure 2:
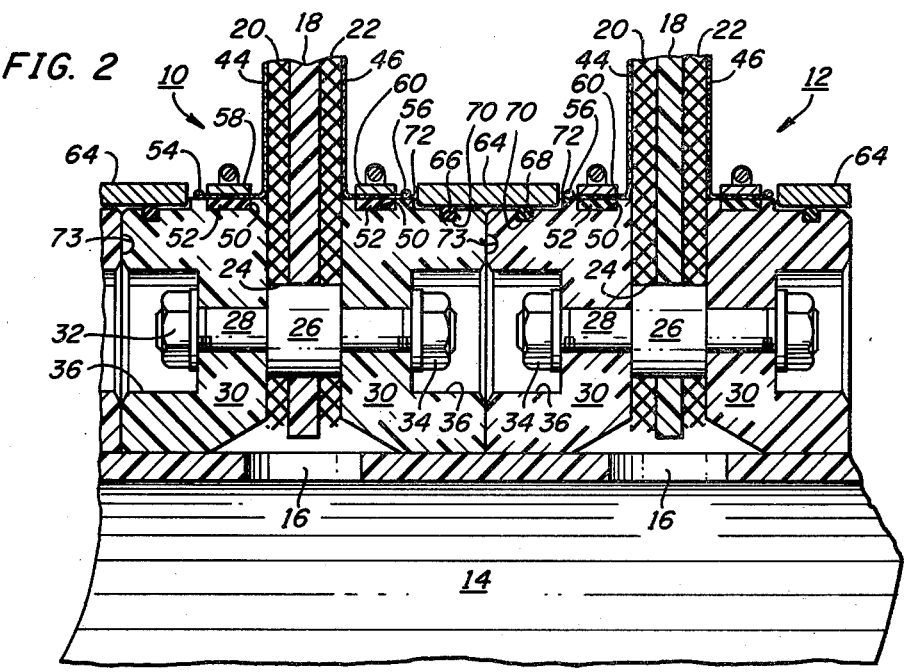
FIG. 2 is a sectional view taken along the line 2—2 of FIG. 1 showing two adjacent filter leaves.

With reference to FIGS. 1 and 2, a pair of circular filter leaf assemblies 10 and 12 are mounted in juxtaposed relationship on a tubular liquid outlet manifold 14 having a plurality of openings 16 in the wall thereof at the respective locations of the filter leaves. It will be understood by those skilled in the art that in a normal filter a large number of filter leaves are stacked on the outlet manifold and tightly clamped together by suitable means such, for example, as a nut (not shown) threaded onto one end of the manifold 14. The outlet manifold and the filter leaves when in use are positioned within the pressure chamber of a pressure filter tank, and the liquid to be filtered is fed under pressure into the tank and exits the filter via the outlet manifold 14 having passed through the filter leaves where entrained solids are removed from the liquid. The present invention finds application in both the vertical and horizontal types of pressure filters wherein the outlet manifold extends in either a vertical or a horizontal direction.

The filter leaf assemblies 10 and 12 are preferably identical in construction and each includes a generally planar supporting core member 18 having perforate drainage members 20 and 22 disposed against opposite faces thereof. A plurality of aligned openings 24 extend through the drainage and core members 18, 20 and 22 near the center of the leaf to receive the large diameter central sections 26 of double end stud members 28. A pair of identical hub rings 30 are positioned on opposite sides of the drainage members 20 and 22, and a pair of associated nuts 32 and 34 are respectively positioned in counter bores 36 of the rings 30 and are threaded onto opposite ends of the stud 28 to clamp the cores 18 and drainage members 20 and 22 between the two rings 30.

In order to support a filter cake thereon, the faces of the drainage members 20 and 22 are respectively covered by fabric sheets 44 and 46 which may be parts of a single piece of material or which may be two separate pieces of material sealed together under a peripheral clamp channel 48 which seals the periphery of the drainage and core members from the ambient.

In order to seal the inner or central area of the fabric pieces 44 and 46 to the respective hub rings 30, the circumferential surfaces of the rings 30 are provided with annular grooves 50 into which resilient gasket rings 52, formed, for example, of rubber, are disposed. The inner radial edges of the fabric sheets 44 and 46 are provided with beads 54 and 56 and the adjacent portions of the fabric material are placed over the gaskets 52. A plurality of band type clamps 58 and 60 then are placed over the fabric to clamp the fabric tightly against the gaskets 52. The clamps 58 and 60 preferably have a width approximating that of the gaskets 52 so that the clamps not only clamp the fabric against the gaskets but also hold the gaskets 52 within the grooves 50. It may be seen that with this construction the differential pressure between the outside of the leaf and the space within the drainage members is not exerted on the gaskets 52 to tend to force them into the drainage members.

Figure 3:
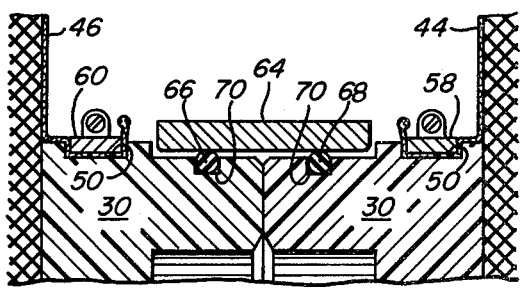
FIG. 3 is a cross-sectional view of a pair of filter leaves embodying another feature of the invention.

With reference to FIG. 3, it may be seen that the fabric sheets 44 and 46 are disposed directly in the grooves 50 and the clamping members 58 and 60 extend partially within the grooves 50 to press the sheets directly against the bottom surfaces of the grooves 52 to effect the necessary seal between the inner edge portions of the sheets 44 and 46 and the hub rings 30.

In order to prevent the unfiltered liquid from passing between the interfaces of adjacent filter leaves into the outlet manifold thereby to contaminate the filtrate, there is provided in accordance with an important feature of the present invention a novel sealing construction which incorporates a unitary tubular ring 64 which extends across the interface between adjacent filter leaves and sealably engages a pair of resilient o-ring gaskets 66 and 68 respectively located in annular grooves 70 in the circumferential surfaces of the hub rings of the adjacent filter leaf assemblies. Each ring is provided with an annular shoulder 72 facing toward the adjacent end of the ring whereby the sealing ring is held captured by the shoulders at its respective ends in the final assembly thereby assuring a sealed connection between each o-ring 66 and the ring 64. The sealing ring 64 is preferably a hollow cylindrical metal member which in addition to providing the seal across the interface between adjacent filter leaves also functions to stabilize the overall assembly to maintain the leaves in axial alignment as the leaves and the manifold expand and contract in response to temperature changes during the use of the overall filter for filtering materials which are at an elevated temperature during the filtration process as in the case, for example, of vegetable oil.

When assembling the leaves onto the outlet manifold 14 of a filter using the leaves of the present invention, the preferred practice is to place a ring 64 over the o-ring 66 and then slide that leaf to the inner end or bottom of the filter. A similar ring is then placed over the outer or upper end of the next leaf which is then slidably moved along the manifold 14 into engagement with the preceding leaf. This procedure is followed until the filter tank is completely filled with filter leaves. Then a nut or the like is threaded onto the upper or outer end of the manifold tube 14 to compress all of the filter leaves together into tight juxtaposed relationship thereby providing a substantially unitary construction as contrasted to the prior art sealing methods wherein the adjacent filter leaves were necessarily separated by the interposed o-ring gasket members.

It will be readily apparent to those skilled in the art that the filter leaf assemblies shown in FIG. 2 can be formed from the existing rotary filter leaves by machining the grooves 70 and 50 therein. The annular grooves 73 in the faces of the hubs which were previously used for supporting o-ring gaskets will no longer serve any useful purpose.

Figure 4:
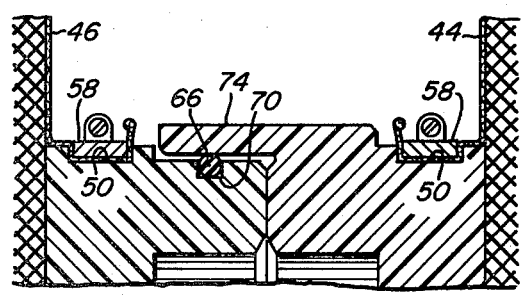
FIG. 4 is a view similar to that of FIG. 3 showing still another embodiment of the invention.

In order to facilitate the manufacture and assembly of filter leaves to seal the interface between adjacent leaves, the ring 64 may be replaced by a tubular, axially extending flange 74 which as shown in FIG. 4 is integral with the hub ring on one side only of the filter leaf assembly. The annular flange 74 overlies and compresses the resilient o-ring 66 provided in the groove 70 of the hub ring of the next adjacent filter leaf assembly. It may be seen that using this embodiment of the invention two different hub rings are required for each filter leaf assembly with the one ring having the flange 74 being located on one side of the leaf and the hub ring having the groove 70 and associated o-ring 66 being located on the other side of the leaf. It may be seen that in the embodiment of FIG. 4 like in the embodiments of FIGS. 2 and 3 the adjacent faces of adjacent filter leaves are compressed tightly against one another to unitize the assembly of filter leaves within the filter chamber.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. For use in the pressure chamber of a pressure filter having a tubular, liquid outlet manifold disposed therein and on which a plurality of filter leaves are mounted in juxtaposed relationship for entraining solids from a liquid passed through said leaves from said chamber to said manifold, the combination wherein each of said filter leaves includes:
   a generally planar supporting and drainage core,
   a pair of axially aligned mounting rings forming the hub of the associated leaf, filter media mounted over said core sealably clamped to said hubs,
   means for clamping the supporting and drainage core of each leaf between the associated mounting rings,
   at least one of said rings having an annular groove in the circumferential surface thereof,
   a resilient sealing gasket mounted in said groove, and
   a rigid, tubular, imperforate cylindrical member extending over said gasket in sealing relationship therewith and being sealably connected to the mutually adjacent ring of the next adjacent filter leaf,
   whereby the juncture between adjacent filter leaves is sealed by said cylindrical member from the chamber in which said filter leaves are disposed.

2. The combination according to claim 1 wherein said cylindrical member is an integral part of one of the mounting rings of said next adjacent filter leaf.

3. The combination according to claim 1 wherein the mutually adjacent mounting rings of adjacent filter leaves are in direct mutual juxtaposition.

4. The combination according to claim 1 wherein each of said leaves further comprises
   first and second fabric sheets respectively disposed over the exterior surfaces of the associated core,
   each of said mounting rings having a circular groove in the circumferential surface thereof with each said groove being spaced from the adjacent face of the associated core,
   resilient annular gaskets disposed in said circular grooves and each having a generally cylindrical outer surface,
   said fabric sheets overlying a respective one of said gaskets, and
   annular clamps compressing said sheets against said gaskets to seal said sheets to said rings.

5. The combination according to claim 4 wherein said circular grooves, said resilient annular gaskets and said annular clamps all have substantially the same width dimension.

6. The combination according to claim 1 wherein each of said leaves further comprises:
first and second fabric sheets respectively disposed over the exterior surfaces of the associated core,
each of said mounting rings having a circular groove in the circumferential surface thereof with each said groove being spaced from the adjacent face of the associated core,
said fabric sheets having continuous annular portions disposed in the respective ones of said circular grooves, and
annular clamps pressing said sheets against the bottoms of said grooves to seal said sheets to said rings.

* * * * *